US006868069B2

(12) United States Patent
Knobbe et al.

(10) Patent No.: US 6,868,069 B2
(45) Date of Patent: Mar. 15, 2005

(54) METHOD AND APPARATUS FOR PASSIVELY CALCULATING LATENCY FOR A NETWORK APPLIANCE

(75) Inventors: Roger Knobbe, Torrance, CA (US); Stephen Schwab, Manhattan Beach, CA (US); Andrew Purtell, Northridge, CA (US)

(73) Assignee: Networks Associates Technology, Inc., Santa Clara, CA (US)

( * ) Notice: Subject to any disclaimer, the term of this patent is extended or adjusted under 35 U.S.C. 154(b) by 879 days.

(21) Appl. No.: 09/764,807

(22) Filed: Jan. 16, 2001

(65) Prior Publication Data

US 2002/0093917 A1 Jul. 18, 2002

(51) Int. Cl.[7] .............................................. H04L 12/28
(52) U.S. Cl. ...................................... 370/252; 370/234
(58) Field of Search ................................ 370/234, 252, 370/401

(56) References Cited

U.S. PATENT DOCUMENTS

| 6,182,125 | B1 | * | 1/2001 | Borella et al. ............... 370/234 |
| 6,618,389 | B2 | * | 9/2003 | Hoefelmeyer et al. ....... 370/401 |
| 6,731,600 | B1 | * | 5/2004 | Patel et al. .................. 370/252 |
| 2001/0050903 | A1 | * | 12/2001 | Vanlint ....................... 370/252 |

OTHER PUBLICATIONS

Configuring Network Address Translation, Dial Solutions Configuration Guide, 12/99.
R. Braden et al., Computing the Internet Checksum, 1988, http://cnswww.cwru.edu/net/offs–ends/rfc/rfc1071.
V. Paxson et al., Framework for IP Performance Metrics, 1998, ftp://ftp.isi.edu/in–notes/rfc2330.txt.
Vern Paxson, Measurements and Analysis of End–to–End Internet Dynamics, 1997, University of California, Berkeley, 4/97.

* cited by examiner

Primary Examiner—Salvatore Cangialosi
(74) Attorney, Agent, or Firm—Zilka-Kotab, PC; Kevin J. Zilka; Christopher J. Hamaty

(57) ABSTRACT

A device that passively monitors arriving and departing data packets on one or more networks, correlates arriving data packets with departing data packets, and calculates a latency estimate based on the confidence of the correlation. The device detects and copies data packets arriving at a network device and the data packets departing from the same network device. A timestamp is stored for each arriving or departing data packet. Latency across a network device can be determined based on the timestamps for correlating data packets. Additionally, latency across a network device per protocol layer can also be calculated. Varying levels of confidence of a latency estimation depend on the operation necessarily performed on the data packet by the network device and the protocol level at which correlation between the arriving and departing data packets can be achieved.

18 Claims, 12 Drawing Sheets

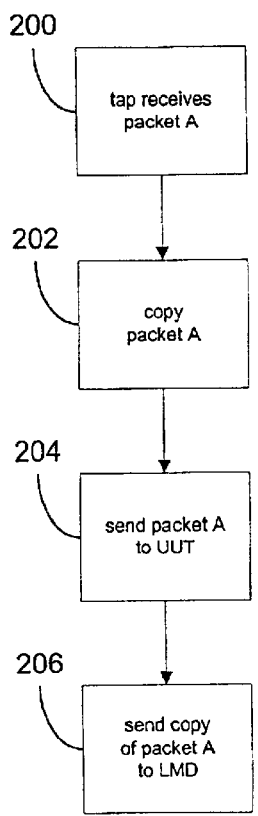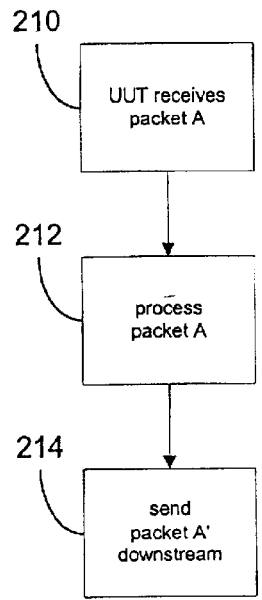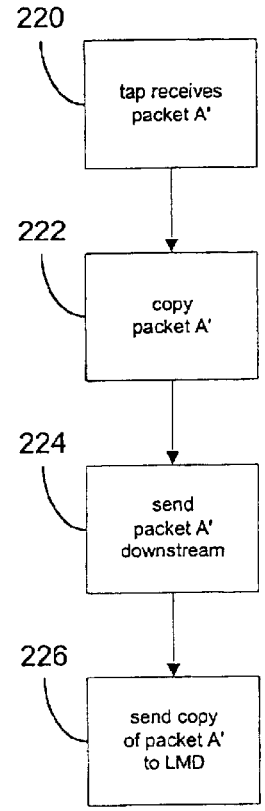
FIG. 5
FIG. 6 (prior art)
FIG. 7

METHOD AND APPARATUS FOR PASSIVELY CALCULATING LATENCY FOR A NETWORK APPLIANCE

BACKGROUND OF THE INVENTION

1. Field of the Invention

The present invention generally relates to methods for measuring the performance of devices on a network, and in particular relates to passively calculating the time required for data packets to traverse a network device in a network.

2. Related Art

Comparison of network appliances is often characterized in terms of bandwidth and latency. For example, the performance of certain network appliances such as hubs, switches, routers, firewalls, and servers is often rated by the number of bytes per second the device can process. This type of bandwidth measurement is well defined and is conventionally easy to obtain.

On the other hand, latency measurements require a certain amount of interpretation and are therefore conventionally difficult to obtain without intrusive probes. This is particularly underscored when attempting to determine the amount of delay, in microseconds per byte, for data packets traveling across routers, firewalls, and servers.

FIG. 1 illustrates a conventional sniffer system as is typically used to measure the latency of a network device. In this system, data packets are sent from network 10 to network 20 through a unit under test ("UUT") 30. A sniffer 40 is placed between network 10 and UUT 30 in order to measure the latency caused by UUT 30 for data packets traveling between network 10 and network 20. For example, UUT 30 may be a router or a bridge.

Data may travel from network 10 to network 20 in discrete units called data packets. For example, data packet DP1 may travel from network 10 to network 20 through UUT 30. In transit between network 10 and network 20, the sniffer 40 detects the transmission of DP1 and generates and stores a timestamp for DP1, relative to the internal clock associated with the sniffer 40.

The DP1 packet is then processed through UUT 30 and forwarded on toward network 20, which returns data packet DP2 in response. The response data packet DP2 is processed back through UUT 30 and forwarded on to network 10. The sniffer 40 detects the transmission of DP2 and generates and stores a timestamp for DP2, relative to the internal clock associated with the sniffer 40.

The sniffer 40 subsequently compares the stored DP1 timestamp (the time DP1 was detected) with the stored DP2 timestamp (the time DP2 was detected) to determine a latency. A drawback of this conventional sniffer system is that the system does not measure the latency produced solely by UUT 30 as outgoing data packet DP1 is processed and returned as incoming data packet DP2. An additional drawback of this conventional system is that the latency time for an entire network is measured rather than the latency time the UUT 30.

FIG. 2 illustrates a conventional two tap system for actively measuring the latency of a network device. Although this system employs two points of reference, which advantageously allows the system to isolate UUT 30, the system is not passive. In operation, tap 50 creates a test data packet DP3 and sends the test data packet DP3 over the network to tap 60. Due to the physical location of taps 50 and 60 relative to UUT 30, the test packet DP3 must travel through UUT 30. Although this system isolates UUT 30, it artificially increases the number data packets traveling on the network. Therefore, the latency measurement may not be accurate due to the artificially increased network traffic, introduced by the conventional two tap system.

An additional drawback of the conventional two tap system is that it requires two discrete units to measure the latency for a network appliance. The first unit, tap 50, is required to create the test data packet DP3, and the second unit, tap 60, is required to retrieve the test data packet DP3. This two discrete unit configuration is problematic in certain test scenarios, for example firewall performance testing, because the firewall may or may not allow the single test data packet DP3 to pass through.

Furthermore, even when test data packet DP3 is allowed to pass through unimpeded, there is little assurance that the test packet DP3 received the same handling and processing as native network data packets. For example, firewalls that were configured to allow test data packets DP3 to pass through may also be configured to give these same test data packets DP3 a higher processing priority. Thus, the integrity of the latency measurement may be called into question for the conventional two tap system.

Therefore, what is needed is a method and apparatus that overcomes these significant problems found in the conventional systems as described above.

SUMMARY OF THE INVENTION

A device that passively monitors arriving and departing data packets on one or more networks, correlates the arriving data packets with the departing data packets, and calculates latency estimates based on the confidence of the correlation. The device detects and copies the data packets arriving at a network device and the data packets departing from the same network device, also called a unit under test ("UUT"). Latency across the UUT can be determined with varying levels of confidence, depending on the operation necessarily performed on the data packet by the UUT and the protocol level at which correlation between the arriving and departing data packets can be achieved.

As data packets are detected and copied by the device, a high resolution timestamp is stored for each data packet prior to queuing the data packet for correlation. Data packets may be correlated at different protocol layers. The lowest correlator level can match data packets at the network specific frame level and can report a latency measurement as accurate as the timestamp resolution on the monitoring device. The highest correlator levels can match data streams that span more than one data packet.

At the higher protocol levels, when data streams are correlated, a ceiling function may be applied to represent the timestamp of a particular data packet that has arrived out of sequence. For example, in the case of reconstructing a TCP stream, the timestamp for a particular data packet in the TCP stream will be the timestamp for the last data packet received that completes the data stream up to the particular data packet. In other words, if data packet 100 arrives before data packet 99, the timestamp for data packet 99 will be applied to data packet 100.

Correlation of data packets and data streams can be achieved across multiple protocols. At the lowest level, the network specific frame correlator will detect the latency of network devices such as a switch or a repeater. At the highest level, the application correlator will detect the latency of network devices such as a World Wide Web ("Web") server or a file transfer protocol ("FTP") server. Any type of correlation may be applied to data packets, subject to external factors such as the amount of storage available to the monitoring device, and the percentage of network traffic visible to the monitoring device.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 5 is a flowchart illustrating a process for intercepting pre-processed data packets on a network according to an embodiment of the invention;

FIG. 6 is a flowchart showing a conventional method for a network appliance to process a data packet received from a network;

FIG. 7 is a flowchart illustrating a process for intercepting processed data packets on a network according to an embodiment of the invention;

DETAILED DESCRIPTION OF THE INVENTION

Certain embodiments as disclosed herein provide for a method and apparatus for passively calculating the latency of a network device. This is accomplished by detecting data packets that are arriving to and departing from the network device and correlating those packets to determine the latency introduced by the device. For example, one embodiment as disclosed herein allows for correlation of data packets ranging from network specific frames to application specific data streams.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
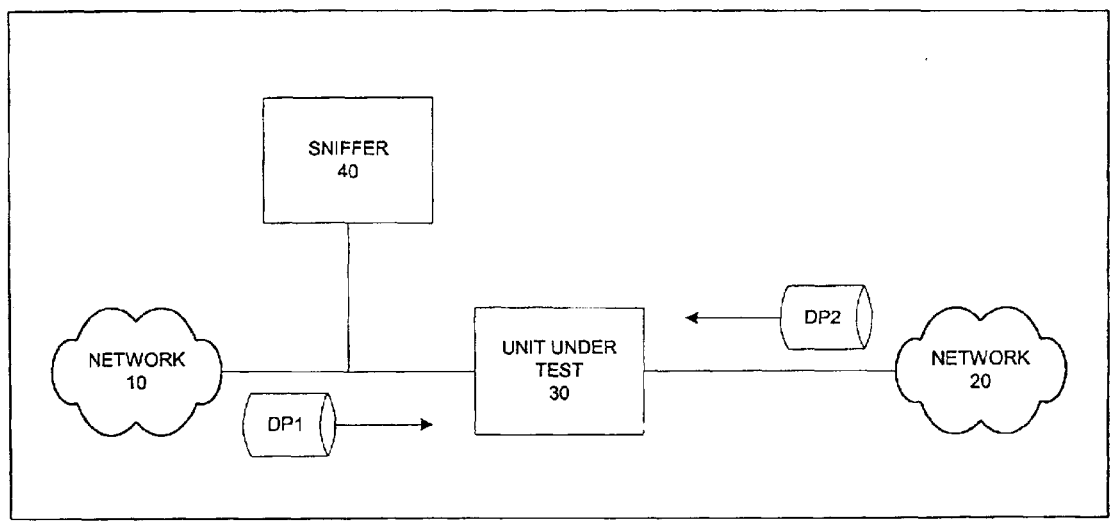
FIG. 1 is a block diagram illustrating a conventional sniffer system for passively measuring the latency of a network device.
Figure 2:
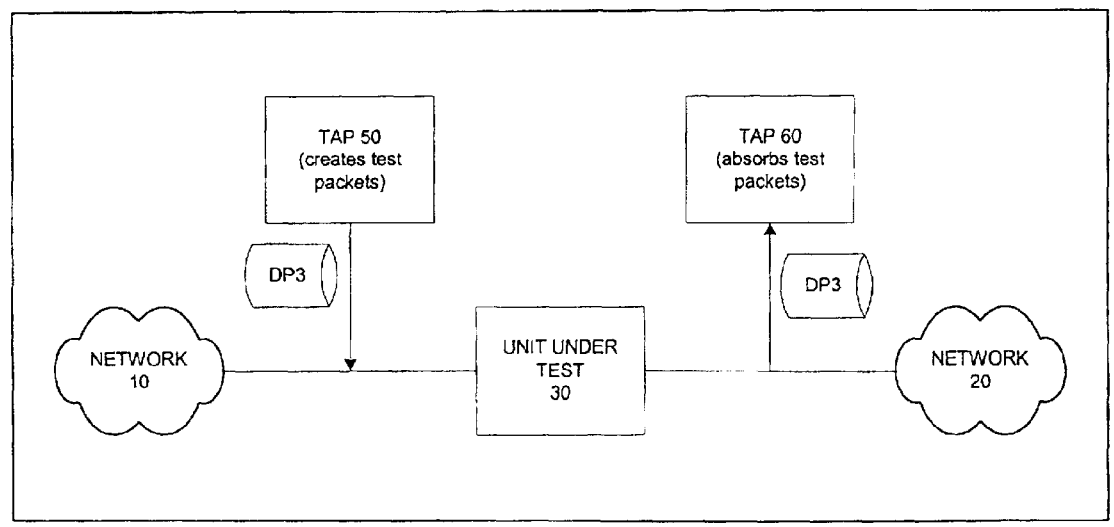
FIG. 2 is a block diagram illustrating a conventional two tap system for actively measuring the latency of a network device.
Figure 3:
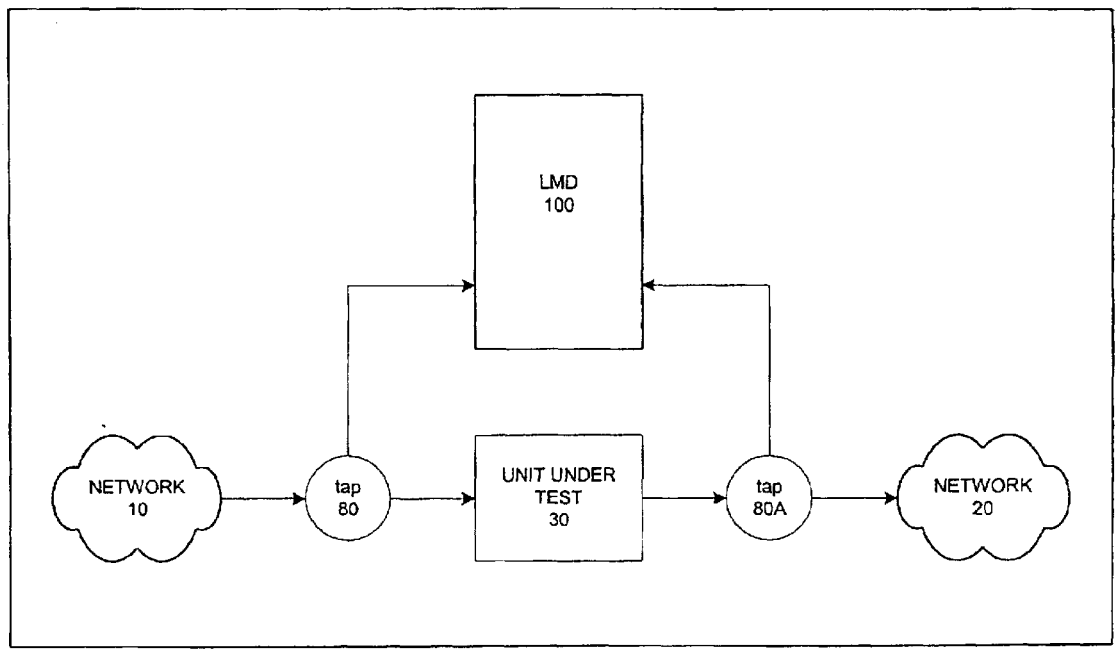
FIG. 3 is a block diagram depicting an overview of a latency measurement device for passively calculating the latency of a network appliance according to an embodiment of the invention.

FIG. 3 is a block diagram illustrating an overview of a latency measurement device for passively calculating the latency of a network device according to an embodiment of the present invention. Data packets flow, according to the diagram, from network 10 toward network 20. Due to the physical layout of the system, data packets that traverse the unit under test ("UUT") 30 when traveling between network 10 and network 20 also pass through tap 80 and tap 80A. The latency measurement device ("LMD") 100 detects the data packets that traverse UUT 30 through network taps 80 and 80A.

Taps 80 and 80A may be any type of network connection as is well known in the art. Once tap 80 or 80A detects a data packet traveling on the network, the tap may copy the data packet and forward the copy of the data packet to LMD 100. The taps 80 and 80A may be situated such that each data packing arriving at or departing from UUT 30 is detected. In one embodiment, UUT 30 is connected to two separate networks. Therefore, tap 80 may be connected to the first network while tap 80A may be connected to the second network. Such an arrangement may allow the network taps 80 and 80A to detect and copy each data packet arriving at or departing from UUT 30.

In an alternative embodiment, UUT 30 may be connected to a plurality of networks. In such an embodiment, LMD 100 may employ as many network taps as required to detect each data packet arriving at or departing from UUT 30 on any of the plurality of networks. Furthermore, the direction of flow for the data packets can be any of the possible directions available on the network. For example, data packets may flow from network 10 toward network 20, as illustrated in FIG. 3. However, data packets may also flow from network 20 toward network 10.

Figure 3A:
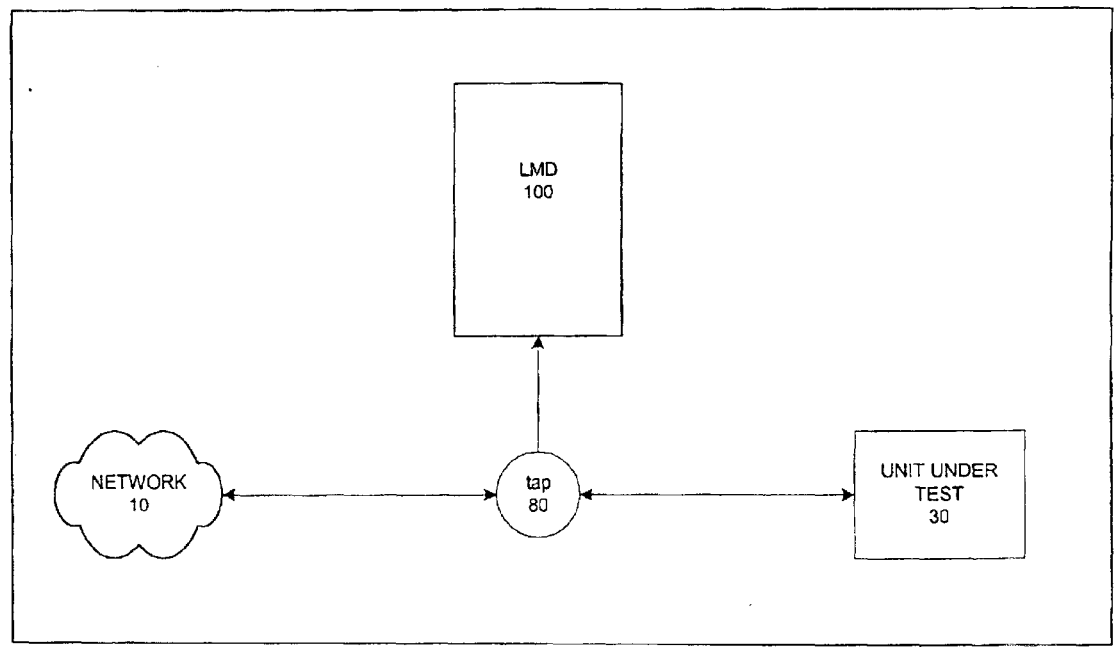
FIG. 3A is a block diagram illustrating an overview of a latency measurement device for passively calculating the latency of a network device according to an embodiment of the present invention.

Additionally, in one embodiment UUT 30 may be connected to only one network. FIG. 3A is a block diagram illustrating an overview of a latency measurement device for passively calculating the latency of a network device according to an embodiment of the present invention. UUT 30 may be a file server or some other sort of network appliance, such as a Web server. For example, requests for Web documents may be transmitted to Web server UUT 30 from network 10. The corresponding Web documents may then be sent back to network 10 a response from UUT 30.

Tap 80 may be advantageously situated between network 10 and UUT 30 such that each incoming request and each outgoing response is detected by tap 80. Furthermore, each data packet detected by tap 80 may be copied and forwarded to LMD 100. LMD 100 may then correlate each incoming data packet with its corresponding outgoing data packet in order to calculate a latency estimation for UUT 30.

Figure 4:
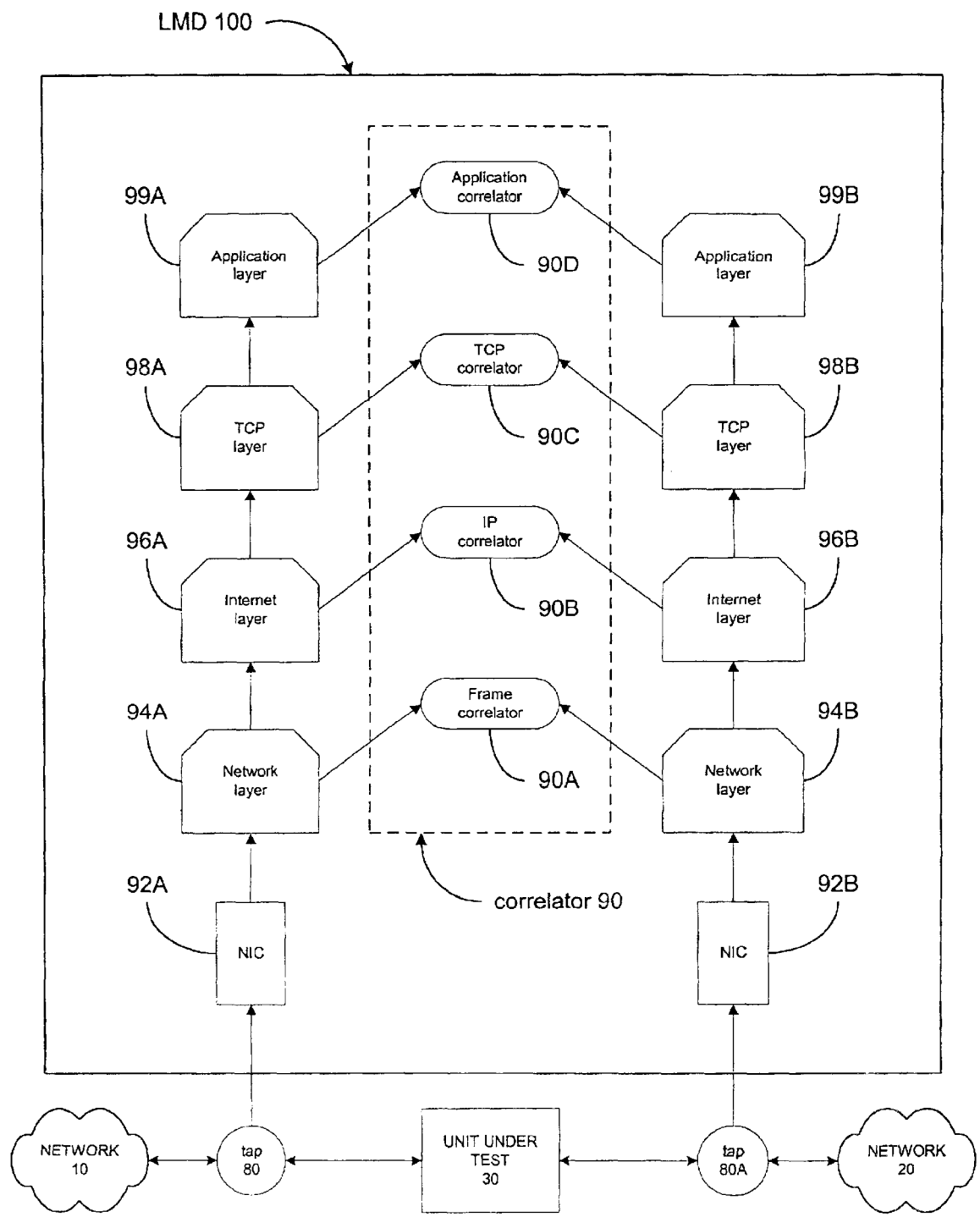
FIG. 4 is a flow diagram illustrating an example data packet flow in a correlation process according to an embodiment of the invention.

FIG. 4 is a flow diagram illustrating an example data packet flow in a correlation process according to an embodiment of the invention. Data packets flow in the system between network 10 and network 20. LMD 100 is configured such that any data packets arriving at UUT 30 or departing from UUT 30 are detected by either tap 80 or tap 80A. Those packets detected by tap 80 or tap 80A are copied by the tap and the data packet copy is forwarded to LMD 100 for correlation.

Data packets forwarded to LMD 100 may be received by a network interface card ("NIC"). In one embodiment, LMD 100 has an NIC that corresponds to each network tap. In FIG. 4, NIC 92A corresponds to tap 80 and NIC 92B corresponds to tap 80A. Once an NIC receives a data packet from the network tap, the data packet may be processed up the protocol stack while also being queued for correlation at each layer.

For example, a communication originating from the application layer may be received by NIC 92A and multiplexed in each protocol layer up to the application layer. Additionally, at each level in LMD 100, the data packet may be queued for correlation. For example, a network specific frame of the communication originating from the application layer may be received by network layer 94A and passed to frame correlator 90A for queuing and subsequent correlation. If the network specific frame is part of a larger communication, the frame may be combined with other frames into a datagram and passed up to Internet layer 96A.

Similarly, Internet layer 96A may pass the datagram to IP correlator 90B for queuing and subsequent correlation. If the datagram is also part of a larger communication, the datagram may be combined with other datagrams into a packet and passed up to TCP layer 98A. TCP layer 98A may pass the packet to TCP correlator 90C for queuing and subsequent correlation. If the packet is part of a larger communication, the packet may be combined with other packets into a message and passed up to Application layer 99A. Finally, Application layer 99A may pass the packet to Application correlator 90D for queuing and subsequent correlation.

A similar process may take place for packets received by NIC 92B. For example, frames received by Network layer 94B may be multiplexed into datagrams and passed to IP layer 96B after being queued for correlation. Datagrams received by IP layer 96B may be multiplexed into packets and passed to TCP layer 98B after being queued for correlation. Packets received by TCP layer 98B may be multiplexed into messages and passed to Application layer 99B after being queued for correlation. And messages received by Application layer 99B may be queued for correlation. Advantageously, this parallel processing and redundant correlation of data packets may increase the robustness of correlation at higher levels of the protocol layer.

In one embodiment, correlation of data packets that are deposited in the particular queues takes place by matching the unique characteristics of corresponding data packets. For example, correlator 90 may be comprised of a frame correlator 90A, an IP correlator 90B, a TCP correlator 90C and an application correlator 90D. These correlators may derive the unique characteristics from the data packets and match the unique characteristics of corresponding data packets.

In one embodiment, frame correlator 90A may correlate network specific frame data packets by deriving and comparing the cyclical redundancy checksum ("CRC") from each network specific frame data packet. Similarly, IP correlator 90B may correlate internet protocol data packets by deriving and comparing the IP header checksum from each internet protocol data packet. Additionally, TCP correlator 90C may correlate transport control protocol data packets by deriving and comparing the TCP header checksum from each transport control protocol data packet. Finally, application correlator 90D may correlate application data packets by comparing strings of data contained within each data packet.

For example, application correlator 90D may select the entire data portion of the data packet as a string segment to be used for comparison with a corresponding string segment from a corresponding data packet. In one embodiment, the longer the string segment used for comparison by the application correlator 90D, the more robust the correlation between two matching data packets.

FIG. 5 is a flowchart illustrating a process for intercepting pre-processed data packets on a network according to an embodiment of the invention. A pre-processed data packet may be a data packet that has been handled by any number of network appliances yet has not been processed by the particular UUT whose latency is being calculated.

For example, a data packet destined for a particular UUT may be detected by a network tap, as illustrated in step 200. In this fashion, the network tap may intercept the data packet and copy the data packet, as shown in step 202. Once the data packet has been copied, in step 204, the network tap may forward the data packet along the network to its ultimate destination. Finally, the network tap may send the copy of the data packet to the LMD for correlation, as illustrated in step 206.

FIG. 6 is a flowchart showing a conventional method for a network appliance to process a data packet received from a network. Accordingly, a network appliance may process a data packet according to the data packet's protocol layer. For example, a network specific frame data packet may simply be routed to its destination by a router appliance while a data packet comprising a portion of an application data stream may be interpreted and responded to by a Web server appliance.

In step 210, a network appliance, or UUT, may receive the data packet. Accordingly, in step 212 the UUT may process the data packet based upon the nature of the UUT as a network appliance (e.g. the function of the UUT) and the protocol level of the data packet. Once the data packet has been processed, the UUT may send the processed data packet along the network to its ultimate destination, as illustrated in step 214.

In an alternative embodiment, a data packet may arrive at the UUT from a particular network interface and depart from the UUT from the same network interface. For example, notwithstanding a plurality of simultaneous network connections in place at the UUT, a data packet may arrive on a first network connection and be processed by the UUT and then subsequently depart from the same first network connection.

FIG. 7 is a flowchart illustrating a process for intercepting processed data packets on a network according to an embodiment of the invention. A processed data packet may be a data packet that has been handled by the particular UUT whose latency is being calculated. A processed data packet may also have been handled by any number of network appliances in addition to the particular UUT whose latency is being calculated.

For example, a data packet that has been processed by a particular UUT may be detected by a network tap, as illustrated in step 220. In this fashion, the network tap may intercept the processed data packet and copy the data packet, as shown in step 222. Once the processed data packet has been copied, in step 224, the network tap may forward the processed data packet along the network to its ultimate destination. Finally, the network tap may send the copy of the processed data packet to the LMD for correlation, as illustrated in step 226.

Figure 8:
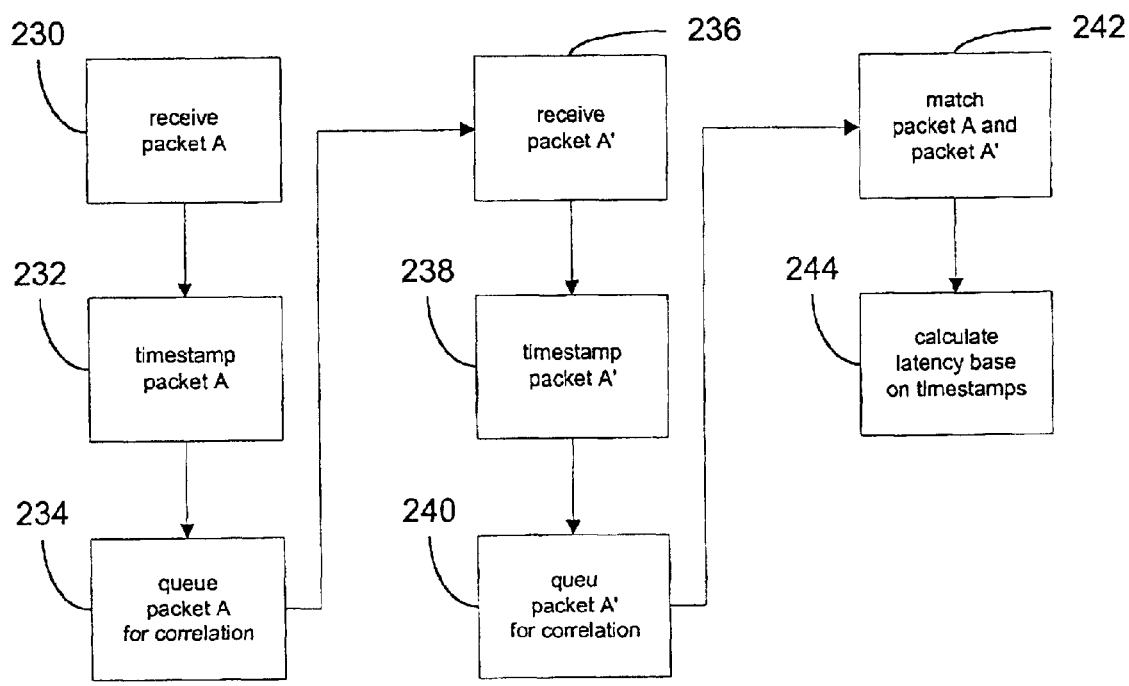
FIG. 8 is a flowchart illustrating a process for calculating a latency for a network appliance based on the timestamps of matching data packets according to an embodiment of the invention.

FIG. 8 is a flowchart illustrating a process for calculating a latency for a particular network appliance based on the timestamps of matching data packets according to an embodiment of the invention. Initially, in step 230, the latency measurement device, or LMD, receives a data packet. In one embodiment, the data packet is received from a network tap through a network interface card.

Once the data packet has been received, the LMD may timestamp the data packet, as illustrated in step 232. In one embodiment, the LMD may append the timestamp data to the data packet itself. For example, a wrapper may be placed around the data packet that contains the timestamp information. Alternatively, the LMD may store the timestamp data in a location separate from the data packet. For example, a supplemental database may be maintained by the LMD in memory or on permanent storage to allow the LMD to save the timestamp information generated for each data packet.

Data packets that have been received and timestamped may be queued for correlation, as shown in step 234. In one embodiment, each data packet may be queued according to its protocol level. For example, a data packet that comprises a network specific frame may be queued for correlation with other network specific frame data packets.

In an alternative embodiment, queuing of data packets may include identifying a unique characteristic for each data packet. For example, a network specific frame data packet, an IP data packet, and a TCP data packet each contain a unique checksum value in the packet header information. This unique checksum may be consulted by the LMD to identify the type of data packet that has been received so that the data packet may be appropriately queued for correlation.

Continuing the example, a string segment from the content of a data packet may be employed as a unique characteristic for the data packet. Although such a string segment is not guaranteed to be unique, a high probability of accurate correlation may still exist. Additionally, to increase the probability of a unique string segment, multiple segments from a plurality of data packets spanning an application data stream may be combined.

In one embodiment, the unique characteristic of the data packet (e.g. checksum value or string segment) may be coupled with the timestamp information and included in wrapper placed around the data packet by the LMD. Alternatively, this information may be separately stored by the LMD in association with the particular data packet.

Processed data packets that correspond to the data packets already received and queued by the LMD may also be received by the LMD, as illustrated in step 236. In step 238, the corresponding processed data packets may be timestamped and then queued for correlation, as shown in step 240. Correlation of the data packets with corresponding processed data packets may be accomplished in step 242 by matching the unique characteristic on one data packet with the unique characteristic of its corresponding data packet. Once the corresponding data packets have been matched with each other, a latency for the particular UUT may be calculated based on the timestamps for each data packet, as illustrated in step 244.

For example, a pre-processed data packet may be received by the LMD and determined to be an IP packet. A timestamp for the IP packet may be stored in memory available to the LMD. And the data packet may be queued for correlation. The same packet, after being processed by the UUT, may be received by the LMD and similarly timestamped and queued for correlation. The LMD may then match the unique checksum of the pre-processed data packet with the unique checksum of the processed data packet. Once the correlation between the two data packets has been established, a latency for the UUT may be calculated by determining the amount of time the lapsed between the timestamp for the pre-processed data packet and the timestamp for the processed data packet. In one embodiment, a plurality of latency calculations over time may provide an average latency for the particular UUT.

Figure 9:
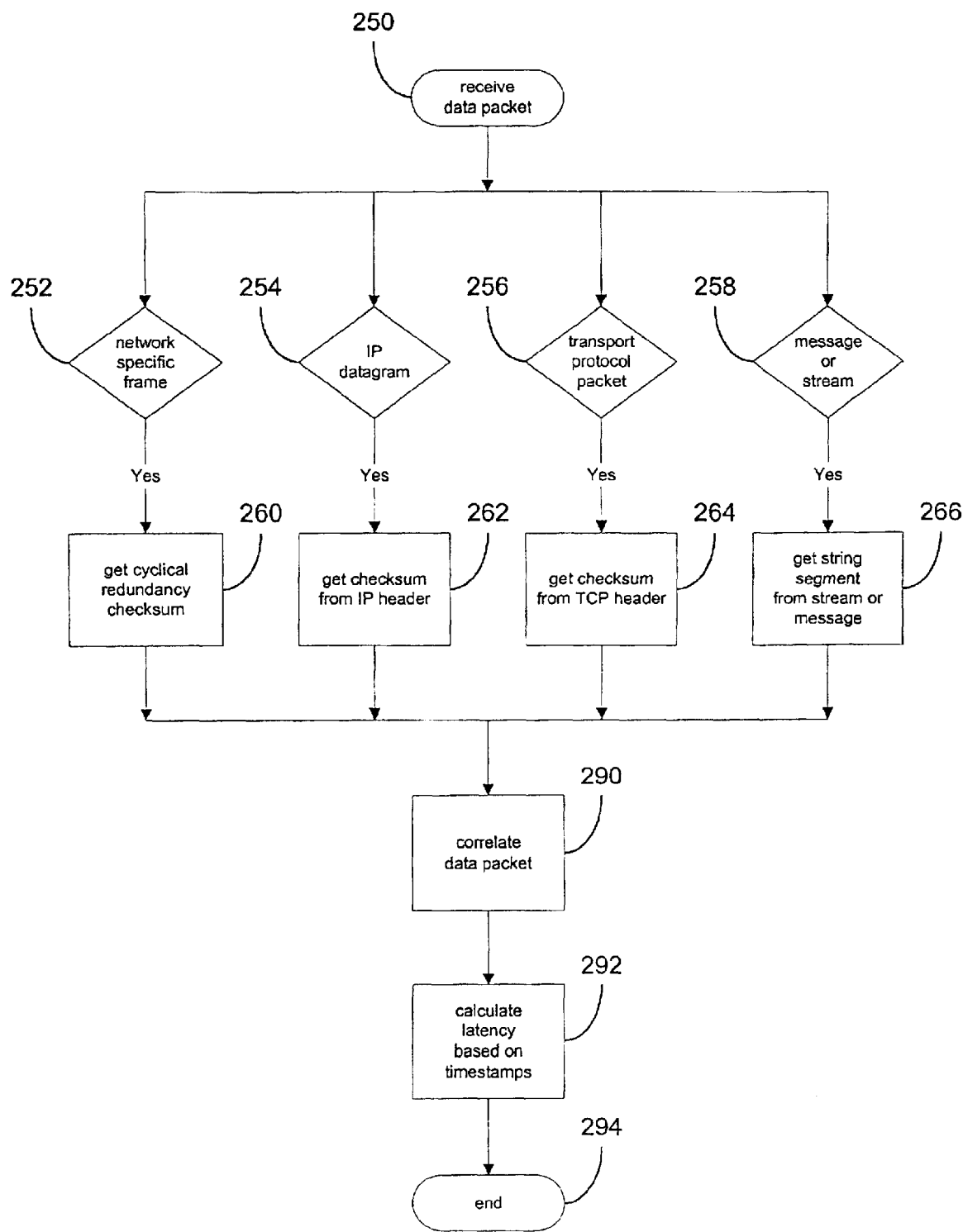
FIG. 9 is a flowchart illustrating a process for correlating and matching data packets according to an embodiment of the invention.

FIG. 9 is a flowchart illustrating a process for correlating and matching data packets according to an embodiment of the invention. As described previously with reference to FIG. 8 and shown in step 250, the process may begin once the LMD has received a data packet. Upon receiving a data packet, the LMD may determine the type of data packet that has been received. In one embodiment, the LMD may determine the type of data packet that has been received by determining the protocol layer of the packet.

For example, the LMD may determine that the data packet comprises a network specific frame as seen in step 252. Examples of network specific frames may include ethernet frames, token ring frames, and any other type of network specific frame known to one having ordinary skill in the art. Additionally, the LMD may determine that the data packet comprises an IP datagram, as shown in step 254, or a transport protocol packet as illustrated in step 256. Furthermore, the LMD may determine that the data packet comprises a message or a stream of data, as depicted in step 258. In such a case, the data packet may be considered part of the application protocol layer.

Once a data packet has been identified, for example by analyzing the protocol layer of the data packet, a unique characteristic of the data packet may also be determined for later use in correlation. In one embodiment, a checksum value included in a data packet may be used as a unique characteristic for that data packet. For example, network specific frames may have a cyclical redundancy checksum value included as part of the frame. The LMD may obtain this value as the unique characteristic of the data packet, as illustrated in step 260.

Additionally, an IP datagram or a TCP packet may include a checksum value as part of the header for the data packet. The LMD may obtain the checksum value from the header of an IP datagram, as shown in step 262, or from the header of a TCP packet as shown in step 264. This value may then be used as the unique characteristic for the corresponding data packet.

Although a checksum value may be computed based on the content of the data packet, it may not be absolutely unique. However, the probability of uniquely identifying a data packet based on a checksum value increases as the entropy in the data packet increases. In other words, when a data packet contains more variable content, the unique quality of a checksum value for that data packet similarly increases.

Additional unique characteristics of a data packet may also be determined for later use in correlation by the LMD. For example, correlation of data packets at any level may employ certain heuristics to capture unique portions of a data packet's protocol header. In some cases, partial matches of the protocol header or the content of the data packet may be considered. In one embodiment, a network address translation ("NAT") table may be maintained to uniquely identify data packets based on a source or destination address. Furthermore the existence of certain flags or options bits in a data packet may be used to derive a unique identifier or characteristic of a data packet.

Alternatively, a contiguous fixed string segment of characters included in the content of a data stream may be used as a unique characteristic. For example, the LMD may obtain a stream segment as the unique characteristic of a data packet, as illustrated in step 266. In one embodiment, the stream segment may be obtained by performing a Boyer-Moore fixed string stream comparison or a similar fixed string stream comparison.

Although a fixed string segment of characters from a data stream may not be absolutely unique, the probability of uniquely identifying the data stream based on a fixed string segment increases as the size of the string segment and the variable nature of the string segment increase. Furthermore, additional heuristics such as a NAT lookup table may be used to reduce the set of potential stream match candidates.

For example, some local networks may implement an internal addressing scheme that may assign non-unique or otherwise invalid global IP addresses to the nodes in the local network. A router linking the local network to the outside network may employ a NAT table to translate the invalid local address to a valid global address. For example, a two element table entry may include (invalid local address, valid global address). Thus, communications directed to the valid global address would be translated to the invalid local address in the NAT table so that the correct node in the local network would receive the packet.

In certain cases, the NAT table may use a three element table entry to translate traffic between the local network and the outside network. This may advantageously allow the router to overload the valid global addresses and thereby allow more local network nodes to communicate with the outside network. For example, a three element table entry may include (invalid local address, valid global address, outside network address). Thus, communications directed to the valid global address would identified as originating from the outside network address and then be translated to the invalid local address in the NAT table so that the correct node in the local network would receive the packet.

In step 290, data packets that have been received by the LMD may be correlated. For example, data packets that have been identified at the same protocol layer may have their unique characteristics compared with each other until a match is found. In one embodiment, two data packets that have matching unique characteristics may be deemed correlated.

Upon correlating two data packets, a latency for the UUT may be calculated based on the respective timestamps of the correlated data packets, as illustrated in step 292. For example, the difference between the timestamp for the first data packet and the timestamp for the second data packet may be calculated as the latency for the UUT. Once a latency has been calculated, the process may end.

Alternatively, the average latency calculation for a particular UUT may include several latency calculations for different pairs of correlated data packets. Similarly, an average latency calculation may be obtained for data packets that belong to certain protocol layers. For example, if the UUT were a Web server, a separate average latency may be calculated for the Web server by incorporating only those latencies calculated for application layer protocol data packets.

Figure 10:
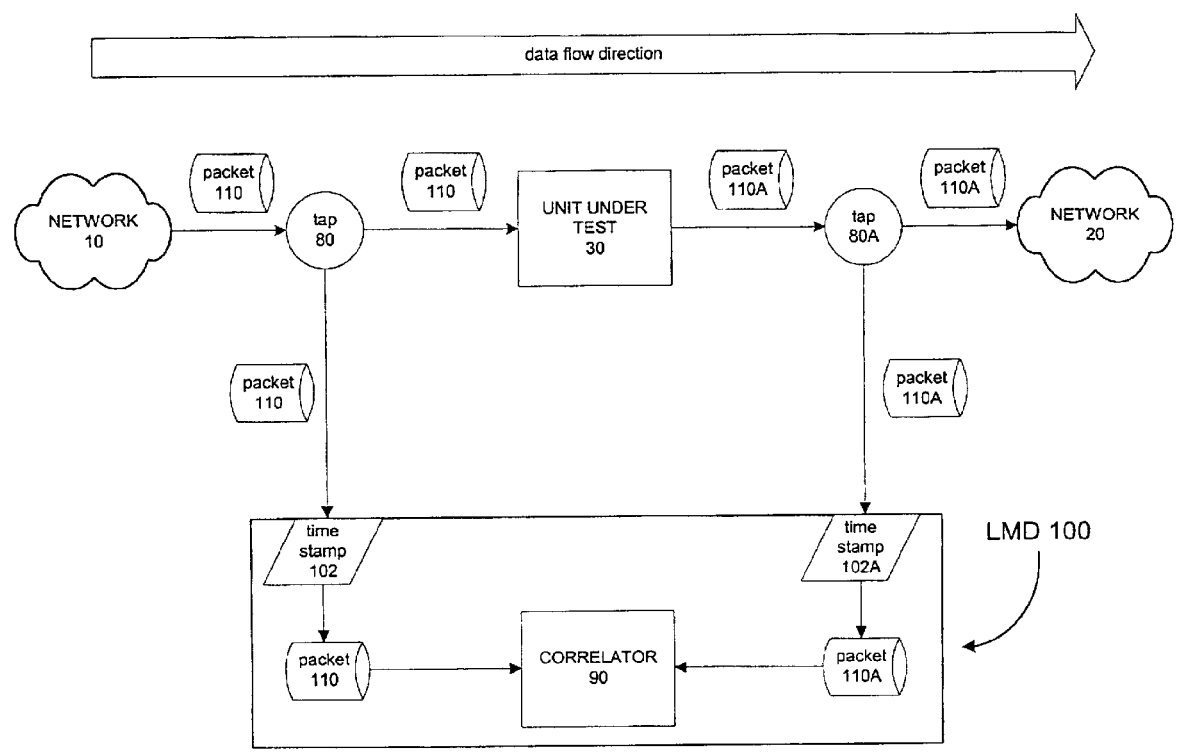
FIG. 10 is a flow diagram showing an exemplary data packet in transmission between two networks and through a latency measurement device according to an embodiment of the invention.

FIG. 10 is a flow diagram showing an exemplary data packet in transmission between two networks and through a latency measurement device according to an embodiment of the invention. Data packet 110 may originate from network 10 and may travel in the data flow direction toward network 20. UUT 30 is positioned between network 10 and network 20 such that data packet 110 may traverse UUT 30 during transmission between network 10 and network 20. Data packet 110A represents data packet 110 once it has been processed by UUT 30.

Tap 80 may advantageously be physically situated such that it detects data packet 110 prior to data packet 110 being processed by UUT 30. Upon detecting data packet 110, tap 80 may copy data packet 110 prior to forwarding data packet 110 on the network toward UUT 30 and the ultimate destination for data packet 110. Additionally, tap 80 may send the copy of data packet 110 to LMD 100.

Upon receiving the copy of data packet 110, LMD 100 may timestamp data packet 110, as illustrated in flow step 102. In one embodiment, LMD 100 may apply a timestamp directly to the data packet 110. For example, a wrapper may be put around the data packet that stores at least timestamp information. Alternatively, LMD 100 may store a timestamp for data packet 110 in memory. The memory used by LMD 100 may be a volatile short term memory or a more permanent memory type such as hard disk drive storage.

Once LMD 100 has received and timestamped data packet 110, the data packet is queued for correlation. For example, LMD 100 may internally pass data packet 110 to correlator 90. In one embodiment, correlator 90 may determine the protocol layer of data packet 110 and queue the packet accordingly. Additionally, LMD 100 may elicit a unique identifier from data packet 110 for later use in the correlation process.

As described above, UUT 30 receives data packet 110 from tap 80. Once UUT 30 has processed data packet 110 it sends processed data packet 110A down the network toward its destination. Advantageously, tap 80A may be situated such that it detects each processed data packet sent by UUT 30. For example, tap 80A may be physically integrated with UUT 30 such that each departing data packet is detected by tap 80A. Alternatively, tap 80A may be communicatively coupled with a network cable such that each departing data packet is detected by tap 80A.

Upon detecting data packet 110A, tap 80A may copy data packet 110A prior to forwarding data packet 110A on the network toward its ultimate destination. Additionally, tap 80A may send the copy of data packet 110A to LMD 100. Upon receiving the copy of data packet 110A, LMD 100 may timestamp data packet 110A, as illustrated in flow step 102A. In one embodiment, LMD 100 may apply a timestamp directly to the data packet 110A, as described above. Alternatively, LMD 100 may store a timestamp for data packet 110A in memory, as also described above.

Once LMD 100 has received and timestamped data packet 110A, the data packet is queued for correlation. For example, LMD 100 may internally pass data packet 110A to correlator 90. In one embodiment, correlator 90 may determine the protocol layer of data packet 110A and queue the packet accordingly. Additionally, LMD 100 may elicit a unique identifier from data packet 110A for later use in the correlation process.

Correlator 90, once it has received data packet 110 and data packet 110A, may consult the unique identifiers for data packets 110 and 110A. In one embodiment, when the unique identifiers for two data packets match, then those two data packets are correlated. Once Correlator 90 has correlated two data packets, LMD 100 may calculate a latency for the particular UUT 30 under test. For example, LMD 100 may compare the timestamps of correlated data packets 110 and 110A to determine the latency of UUT 30.

Figure 11:
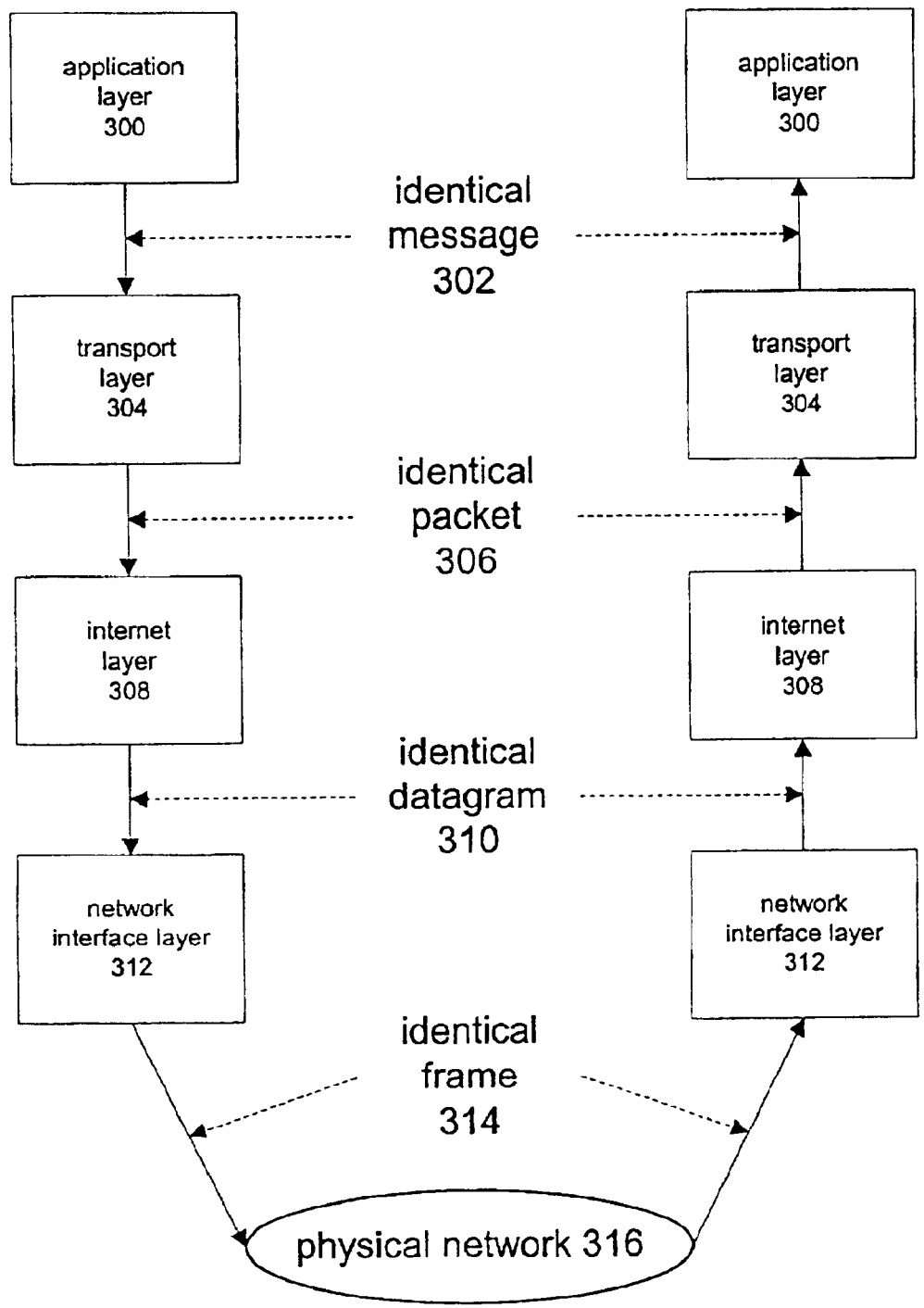
FIG. 11 is a block diagram illustrating a conventional protocol layering principle widely used in TCP/IP networking environments.

FIG. 11 is a block diagram illustrating a conventional protocol layering principle widely used in TCP/IP networking environments. Messages passed from a first computer to a second computer may first travel down the protocol layers of the first computer, then travel across a network, and then travel up the protocol layers of the second computer.

For example, a communication from an application running on a first computer originates in application layer 300. This communication may be passed by the application as message 302 to the transport layer 304. The transport layer 304 may pass the message 302 as packet 306 to the internet layer 308. The internet layer 308 may then pass the packet 306 as datagram 310 to the network interface layer 312. The network interface layer 312 may then pass the datagram 310 as network specific frame 314 to the physical network 316.

The network specific frame 314 may travel across the physical network 316 or across multiple physical networks 316 to its destination in a second computer. Upon reaching its destination, the identical frame 314 may be received at the network interface layer 312. The network interface layer 312 may then pass the frame 314 as datagram 310 to the internet layer 308. The internet layer 308 may then pass the datagram 310 as packet 306 to the transport layer 304. The transport layer 304 may then pass the packet 306 as message 302 to application layer 300 where the message is received as a communication in an application. Frame 314, datagram 310, packet 306 and message 302 are identical when traveling between the protocol layers in a TCP/IP networking environment.

Figure 12:
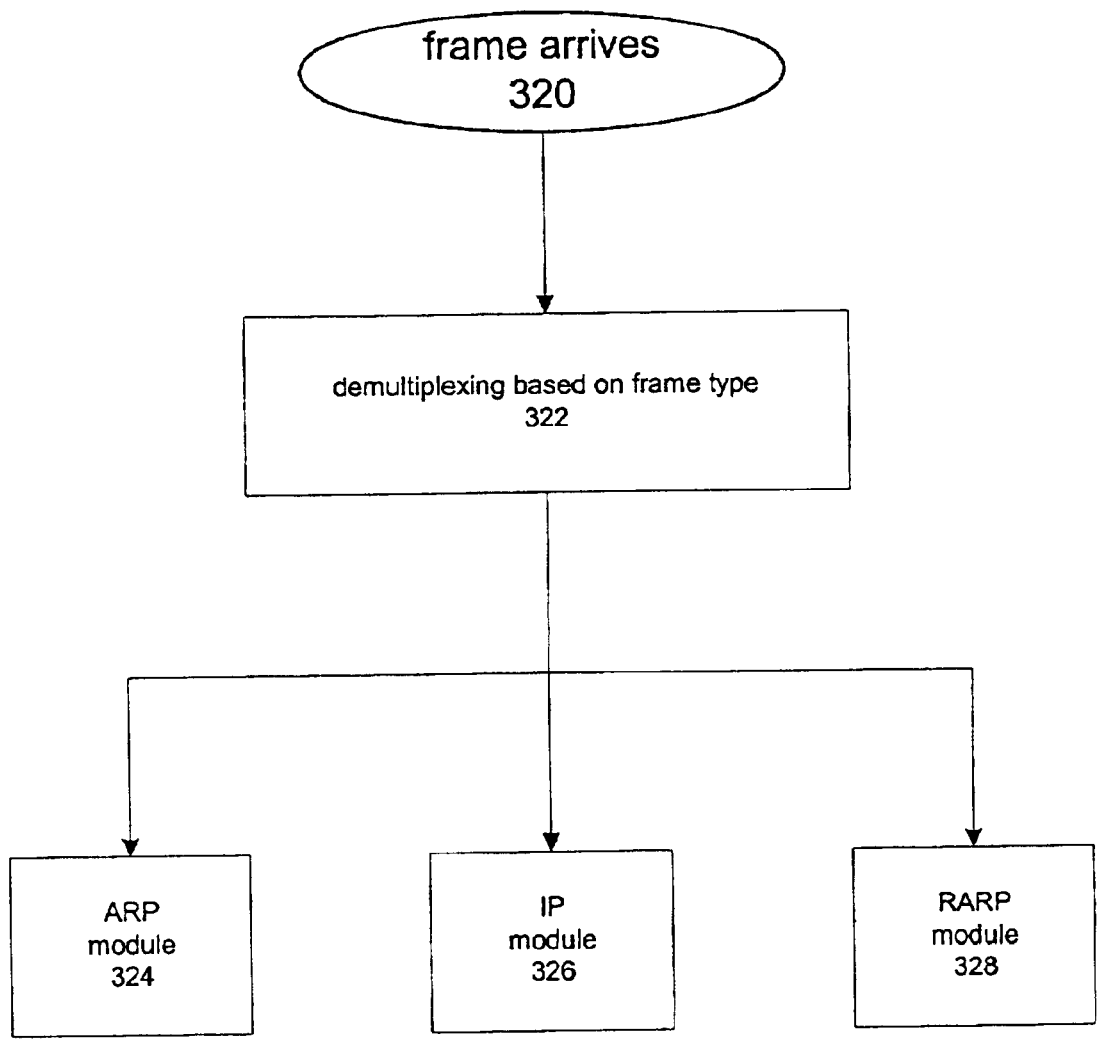
FIG. 12 is a flow diagram illustrating a conventional technique for demultiplexing incoming data packets based on a protocol type found in the data packet header.

FIG. 12 is a flow diagram illustrating a conventional technique for demultiplexing incoming data packets, or frames, based on a protocol type found in the frame header. Communication protocols employ multiplexing and demultiplexing techniques between protocol layers in TCP/IP networking environments. For example, when sending a communication, the source computer may include additional information such as the message type, originating application, and protocols used. Eventually, all messages are placed into network frames for transfer and combined into a stream of data packets. At the receiving end, the destination computer uses the additional information in the network frame to guide the processing of the communication.

For example, in step 320, a frame arrives at the destination computer. Once the frame has been received, the frame is parsed to determine the frame's particular type, as illustrated in step 322. A frame may be one of a variety of frame types. Example frame types include, but are not limited to, address resolution protocol ("ARP"), internet protocol ("IP"), and reverse address resolution protocol ("RARP").

Once the frame type has been determined, the content of the frame is passed to a module that is capable of processing the datagram. For example, an ARP datagram may be passed to ARP module 324 for processing. Alternatively, if the frame type indicated an IP datagram, the IP datagram may be passed to IP module 326 for processing up to the next layer in the protocol stack. Additionally, a RARP datagram may be passed to RARP module 328 for processing.

Figure 13:
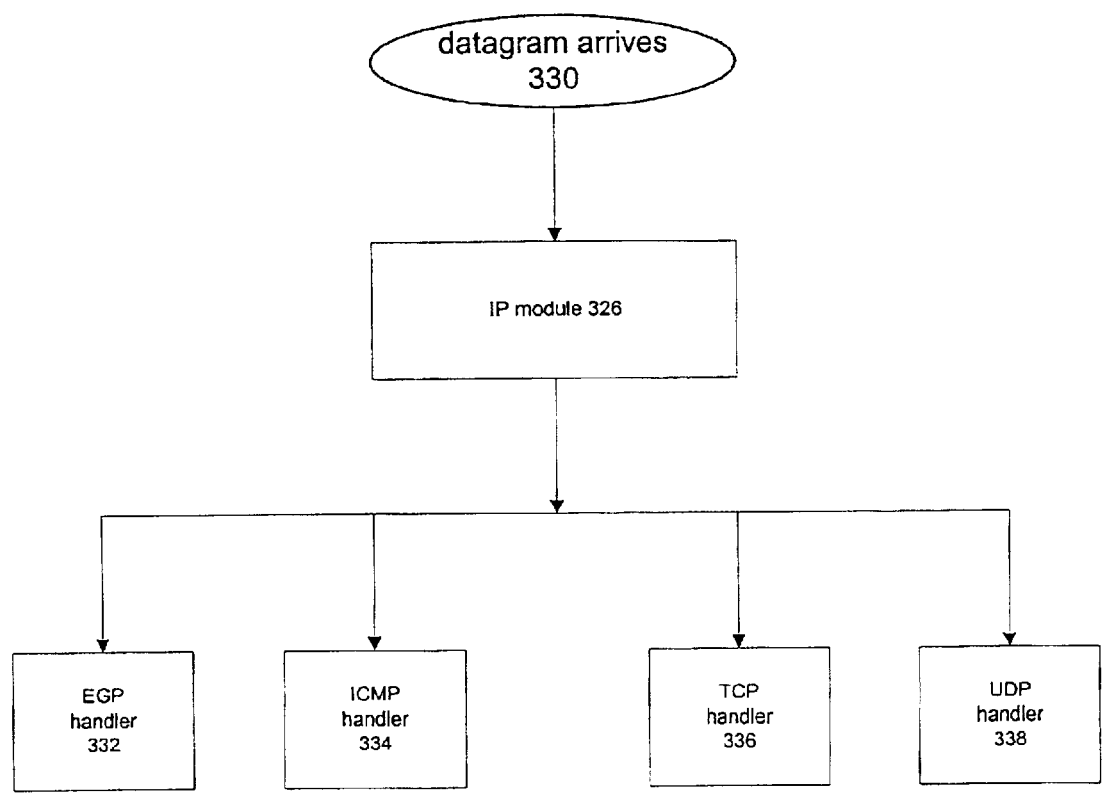
FIG. 13 is a flow diagram illustrating a conventional technique for demultiplexing incoming data packets based on a type found in the IP datagram header.

FIG. 13 is a flow diagram illustrating a conventional technique for demultiplexing incoming datagrams based on a type found in the IP datagram header. Similar to the processing of frames, IP datagrams may be parsed to determine how to process the particular datagram. For example, in step 330 an IP datagram arrives and is routed to the appropriate module for processing. IP module 326 may parse the datagram to determine the datagram type. Example datagram types include, but are not limited to, internet control message protocol ("ICMP"), user datagram protocol ("UDP"), transport control protocol ("TCP"), and exterior gateway protocol ("EGP").

Once the datagram type has been determined, IP module 326 may select a protocol handler for the packet included in the datagram. For example, an EGP datagram may be forwarded to EGP handler 332. Similarly, an ICMP datagram may be forwarded to ICMP handler 334 while a TCP datagram may be sent to TCP handler 336 for processing up to the next layer in the protocol stack. Additionally, a UDP datagram may be sent to UDP handler 338 for processing.

Figure 14:
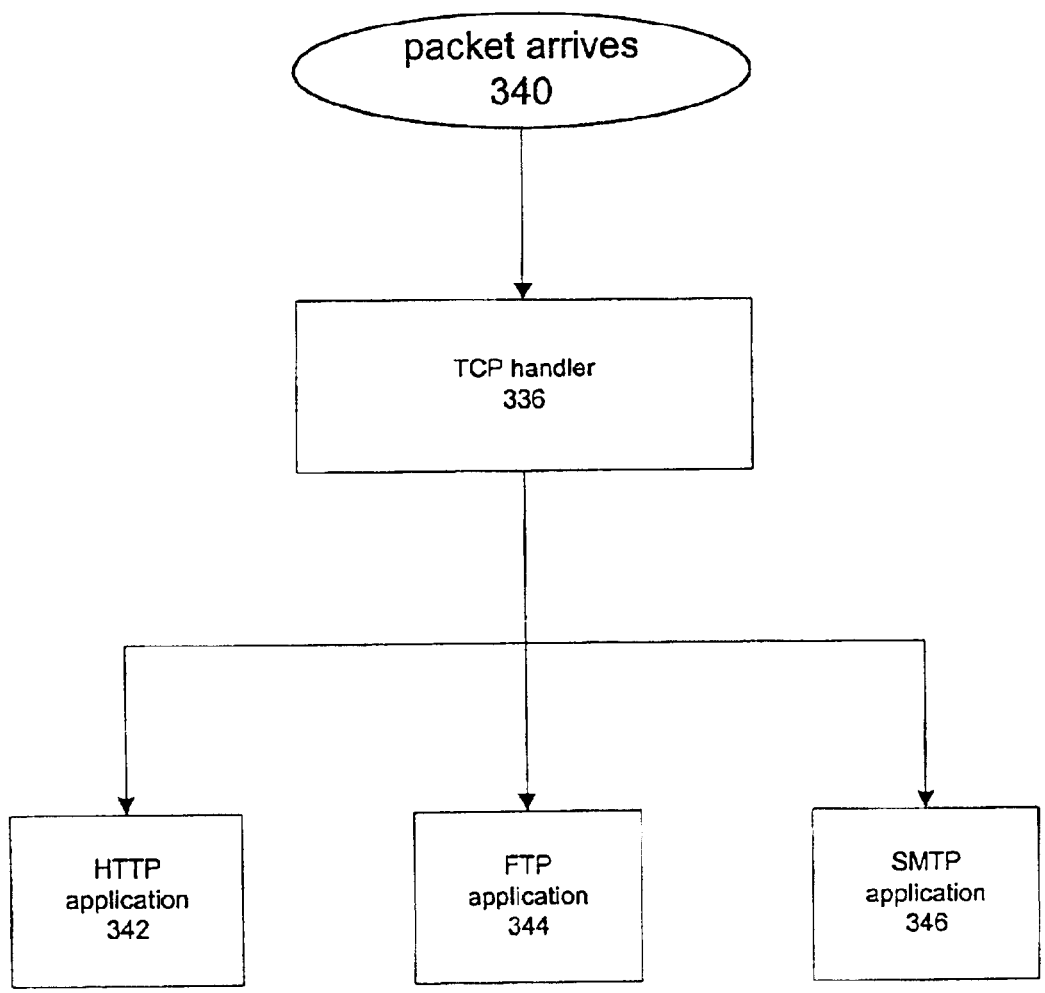
FIG. 14 is a flow diagram illustrating a conventional technique for demultiplexing incoming data packets based on a type found in the TCP packet header.

FIG. 14 is a flow diagram illustrating a conventional technique for demultiplexing incoming messages based on a type found in the TCP packet header. Similar to the processing of frames and datagrams, TCP messages may be parsed to determine which application is suited to receive the particular message type. For example, in step 340 a TCP message arrives and is routed to the TCP handler 336 for the appropriate processing. TCP handler 336 may parse the message to determine the message type and the particular originating application.

Example message types include, but are not limited to, hyper text transfer protocol ("HTTP"), file transfer protocol ("FTP"), and simple mail transfer protocol ("SMTP"). An extensive set of applications are commercially available for use with these and other message types. For example, Netscape Navigator and Microsoft Explorer are applications that use HTTP messages; WS_FTP is an application that uses FTP messages, and Eudora and Microsoft Outlook are applications that use SMTP messages. Additional examples of applications are well known, although not mentioned herein.

Once the message type has been determined by TCP handler 336, the message may be routed to the appropriate application for processing. For example, an HTTP message may be forwarded to HTTP application 342. Similarly, an FTP message may be forwarded to FTP application 344 while an SMTP message may be sent to SMTP application 346 for processing by the application and possibly delivery to an end user.

Figure 15:
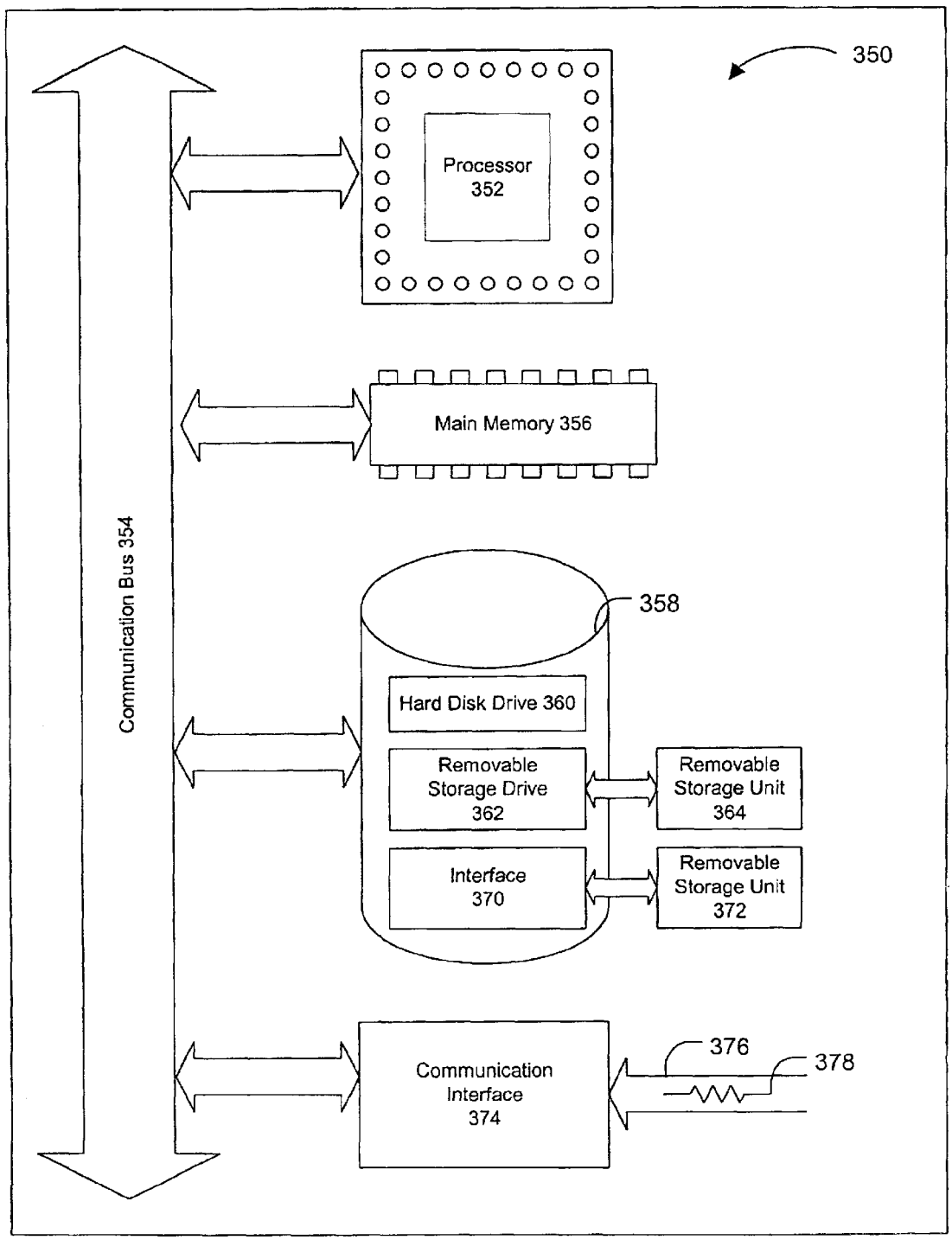
FIG. 15 is block diagram illustrating an exemplary computer system in which elements of the present invention may be implemented according to an embodiment of the invention.

FIG. 15 is a block diagram illustrating an exemplary computer system 350 in which elements and functionality of the present invention are implemented according to one embodiment of the present invention. The present invention may be implemented using hardware, software, or a combination thereof and may be implemented in a computer system or other processing system. Various software embodiments are described in terms of exemplary computer system 350. After reading this description, it will become apparent to a person having ordinary skill in the relevant art how to implement the invention using other computer systems, processing systems, or computer architectures.

The computer system 350 includes one or more processors, such as processor 352. Additional processors may be provided, such as an auxiliary processor to manage input/output, an auxiliary processor to perform floating point mathematical operations, a special-purpose microprocessor having an architecture suitable for fast execution of signal processing algorithms ("digital signal processor"), a slave processor subordinate to the main processing system ("backend processor"), an additional microprocessor or controller for dual or multiple processor systems, or a coprocessor. It is recognized that such auxiliary processors may be discrete processors or may be integrated with the processor 352.

The processor 352 is connected to a communication bus 354. The communication bus 354 may include a data channel for facilitating information transfer between storage and other peripheral components of the computer system 350. The communication bus 354 further provides the set of signals required for communication with the processor 352, including a data bus, address bus, and control bus (not shown). The communication bus 354 may comprise any known bus architecture according to promulgated standards, for example, industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and the like.

Computer system 350 includes a main memory 356 and may also include a secondary memory 358. The main memory 356 provides storage of instructions and data for programs executing on the processor 352. The main memory 356 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, as well as read only memory (ROM).

The secondary memory 358 may include a hard disk drive 360 and/or a removable storage drive 362, for example a floppy disk drive, a magnetic tape drive, an optical disk drive, etc. The removable storage drive 362 may read from and write to a removable storage unit 364 in a well-known manner. Removable storage unit 364 may be, for example, a floppy disk, magnetic tape, optical disk, etc. which may be read from and written to by removable storage drive 362. Additionally, the removable storage unit 364 may include a computer usable storage medium with computer software and computer data stored thereon.

In alternative embodiments, secondary memory 358 may include other similar means for allowing computer programs or other instructions to be loaded into the computer system 350. Such means may include, for example, interface 370 and removable storage unit 372. Examples of secondary memory 358 may include semiconductor-based memory such as programmable read-only memory (PROM), erasable programmable read-only memory (EPROM), electrically erasable read-only memory (EEPROM), or flash memory (block oriented memory similar to EEPROM). Also included are any other interfaces 370 and removable storage units 372 that allow software and data to be transferred from the removable storage unit 372 to the computer system 350 through interface 370.

Computer system 350 may also include a communication interface 374. Communication interface 374 allows software and data to be transferred between computer system 350 and external devices, networks or information sources. Examples of communication interface 374 include but are not limited to a modem, a network interface (for example an Ethernet card), a communications port, a PCMCIA slot and card, an infrared interface, and the like.

Communication interface 374 preferably implements industry promulgated architecture standards, such as Ethernet IEEE 802 standards, Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. Software and data transferred via communication interface 374 may be in the form of signals 378 which may be electronic, electromagnetic, optical or other signals capable of being received by communication interface 374. These signals 378 are provided to communication interface 374 via channel 376. Channel 376 carries signals 378 and may be implemented using wire or cable, fiber optics, a phone line, a cellular phone link, a radio frequency (RF) link, or other communications channels.

Computer programming instructions (also known as computer programs, software, or firmware) may be stored in the main memory 356 and the secondary memory 358. Computer programs may also be received via communication interface 374. Such computer programs, when executed, enable the computer system 350 to perform the features of the present invention. In particular, execution of the computer programming instructions may enable the processor 352 to perform the features and functions of the present invention. Accordingly, such computer programs represent controllers of the computer system 350.

In this document, the term "computer program product" is used to refer to any medium used to provide programming instructions to the computer system 350. Examples of certain media include removable storage units 364 and 372, a hard disk installed in hard disk drive 360, and signals 378. Thus, a computer program products may be a means for providing programming instructions to the computer system 350.

In an embodiment where the invention is implemented using software, the software may be stored in a computer program product and loaded into computer system 350 using hard disk drive 360, removable storage drive 362, interface 370 or communication interface 374. The computer programming instructions, when executed by the processor 352, may cause the processor 352 to perform the features and functions of the invention as described herein.

In another embodiment, the invention may be implemented primarily in hardware using, for example, hardware components such as application specific integrated circuits ("ASICs"). Implementation of the hardware state machine so as to perform the functions described herein will be apparent to persons having ordinary skill in the relevant art.

In yet another embodiment, the invention may be implemented using a combination of both hardware and software. It is understood that modification or reconfiguration of the computer system 350 by one having ordinary skill in the relevant art does not depart from the scope or the spirit of the present invention.

While the particular method and apparatus for passively calculating the latency for a network appliance herein shown and described in detail is fully capable of attaining the above described objects of this invention, it is understood that the description and drawings represent the presently preferred embodiment of the invention and are, as such, a representative of the subject matter which is broadly contemplated by the present invention. It is further understood that the scope of the present invention fully encompasses other embodiments that may become obvious to those skilled in the art, and that the scope of the present invention is accordingly limited by nothing other than the appended claims.

What is claimed is:

1. An apparatus for passively measuring the time required for one or more data packets to traverse a network device in a network, said network device communicatively connectable to said network, comprising:
   a first network connection for communicatively connecting with said network and for detecting an incoming data packet arriving at said network device;
   a second network connection for communicatively connecting to said network and for detecting an outgoing data packet departing from said network device;
   a correlator for correlating said incoming data packet with said outgoing data packet; and
   a calculator for calculating a latency period between detecting said incoming data packet and detecting said outgoing data packet;
   wherein an arrival of said incoming data packet precedes a departure of said outgoing data packet and processing by said network device, and said latency of said processing on said network device is calculated.

2. The apparatus of claim 1 wherein said calculator further comprises:
   an electronic memory for storing a first timestamp associated with said incoming data packet and second timestamp associated with said outgoing data packet wherein the calculator is for calculating said latency period based on the difference between said first and second timestamps.

3. The apparatus of claim 1 wherein said correlator is for comparing said incoming data packet with said outgoing data packet to determine whether said incoming data packet and said outgoing data packet represent at least partially the same data packet at different stages of transit.

4. The apparatus of claim 3 wherein said correlator includes a means for comparing a data packet checksum of said incoming data packet with a data packet checksum of said outgoing data packet.

5. The apparatus of claim 3 wherein said correlator includes a means for comparing a data segment spanning one or more data packets of an incoming data stream with a data segment spanning one or more data packets of an outgoing data stream.

6. The apparatus of claim 3 wherein said correlator includes a means for comparing a source or destination network address of an incoming data packet with an entry in a network address translation table to correlate said incoming data packet with an outgoing data packet having a corresponding source or destination network address entry in said network address translation table.

7. A method for passively measuring a latency for a network device in a network wherein said network device is communicatively connectable to said network, said method comprising the steps of:
   detecting an incoming data packet for said network device;
   storing a first timestamp for said incoming data packet;
   detecting an outgoing data packet from said network device;
   storing a second timestamp for said outgoing data packet;
   correlating said incoming data packet with said outgoing data packet; and
   calculating said latency for said network device based on said first timestamp and said second timestamp;
   wherein an arrival of said incoming data packet precedes a departure of said outgoing data packet and processing by said network device, and said latency of said processing on said network device is calculated.

8. The method of claim 7 wherein said correlating step further comprises comparing a data packet checksum from said incoming data packet with a corresponding data packet checksum from said outgoing data packet.

9. The method of claim 7 wherein said incoming data packet is a stream of data packets from an application layer request and said outgoing data packet is a corresponding stream of data packets from an application layer response.

10. The method of claim 9 wherein said correlating step further comprises comparing a data segment spanning one or more data packets of said incoming data stream with a data segment spanning one or more data packets of said outgoing data stream.

11. The method of claim 7 wherein said correlating step further includes comparing a source or destination network address of an incoming data packet with an entry in a network address translation table to correlate said incoming data packet with an outgoing data packet having a corresponding source or destination network address entry in said network address translation table.

12. A computer program product for passively measuring the time required for a data packet to traverse a network device, comprising:
   instructions for detecting an incoming data packet arriving at said network device;
   instructions for storing a first timestamp for said incoming data packet;
   instructions for detecting an outgoing data packet departing from said network device;
   instructions for storing a second timestamp for said outgoing data packet;
   instructions for correlating said incoming data packet with said outgoing data packet; and
   instructions for calculating a latency for said network device based on said first timestamp and said second timestamp;
   wherein an arrival of said incoming data packet precedes a departure of said outgoing data packet and processing by said network device, and said latency of said processing on said network device is calculated.

13. An apparatus for passively measuring a latency for a network device in a network wherein said network device is communicatively connectable to said network, comprising:
   means for replicating a pre-processed data packet incoming to said network device;
   means for storing a first timestamp for said pre-processed data packet;
   means for replicating a processed data packet departing from said network device wherein said processed data packet represents the pre-processed data packet after said pre-processed data packet has been processed by said network device;
   means for storing a second timestamp for said processed data packet;
   means for correlating said pre-processed data packet and said processed data packet; and
   means for calculating said latency far said network device based on said first timestamp and said second timestamp;
   wherein an arrival of said incoming data packet precedes a departure of said outgoing data packet and processing by said network device, and said latency of said processing on said network device is calculated.

14. A method for passively measuring a latency for a network device in a network wherein said network device is communicatively connectable to the network, said method comprising the steps of:

detecting an incoming data packet arriving at said network device;

storing a first timestamp for said incoming data packet;

determining a first type for said incoming data packet;

obtaining a first identifier based on the contents of said incoming data packet;

detecting an outgoing data packet departing from said network device;

storing a second timestamp for said outgoing data packet;

determining a second type for said outgoing data packet;

obtaining a second identifier based on the contents of said outgoing data packet;

comparing said first type with said second type and said first identifier with said second identifier to correlate said incoming data packet with said outgoing data packet; and calculating said latency for said network device based on said first timestamp and said second timestamp;

wherein an arrival of said incoming data packet precedes a departure of said outgoing data packet and processing by said network device, and said latency of said processing on said network device is calculated.

15. The method of claim 14 wherein said first identifier is a data packet checksum from said incoming data packet and said second identifier is a data packet checksum from said outgoing data packet.

16. The method of claim 14 wherein said first identifier is a data packet string segment from said incoming data packet and said second identifier is a data packet string segment from said outgoing data packet.

17. The method of claim 14 wherein said correlating step further includes comparing a source or destination network address of an incoming data packet with an entry in a network address translation table to correlate said incoming data packet with an outgoing data packet having a corresponding source or destination network address entry in said network address translation table.

18. A method for passively measuring the time required for one or more application data packets to traverse a network device in a network, said network device communicatively connectable to said network, comprising:

detecting an incoming application data packet for said network device;

storing a first timestamp for said incoming application data packet;

determining a first application service for said incoming application data packet;

detecting an outgoing application data packet from said network device;

storing a second timestamp for said outgoing application data packet;

determining a second application service for said outgoing application data packet;

correlating said incoming data packet with said outgoing data packet wherein said correlation is based on said first application service and said second application service and wherein said correlation is based on a first application data packet string segment for said incoming application data packer and a second application data packet string segment for said outgoing application data packet; and calculating a latency for said network device based on said first timestamp and said second timestamp;

wherein an arrival of said incoming data packet precedes a departure of said outgoing data packet and processing by said network device, and said latency of said processing on said network device is calculated.

* * * * *

UNITED STATES PATENT AND TRADEMARK OFFICE
CERTIFICATE OF CORRECTION

PATENT NO. : 6,868,069 B2  Page 1 of 1
APPLICATION NO. : 09/764807
DATED : March 15, 2005
INVENTOR(S) : Knobbe et al.

It is certified that error appears in the above-identified patent and that said Letters Patent is hereby corrected as shown below:

col. 16, line 61 replace "far" with --for--;
   col. 18, line 27 replace "packer" with --packet--.

Signed and Sealed this

Ninth Day of February, 2010

David J. Kappos
*Director of the United States Patent and Trademark Office*